(12) United States Patent
Moon et al.

(10) Patent No.: US 9,154,273 B2
(45) Date of Patent: Oct. 6, 2015

(54) METHOD AND APPARATUS FOR DATA TRANSMISSION USING A DATA FRAME

(75) Inventors: Sung-Ho Moon, Gyeonggi-Do (KR);
Min-Seok Noh, Gyeonggi-Do (KR);
Jin-Sam Kwak, Gyeonggi-Do (KR);
Dong-Cheol Kim, Gyeonggi-Do (KR);
Seung-Hee Han, Gyeonggi-Do (KR);
Hyun-Woo Lee, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 27 days.

(21) Appl. No.: 13/141,313

(22) PCT Filed: Dec. 21, 2009

(86) PCT No.: PCT/KR2009/007646
§ 371 (c)(1),
(2), (4) Date: Jun. 21, 2011

(87) PCT Pub. No.: WO2010/074472
PCT Pub. Date: Jul. 1, 2010

(65) Prior Publication Data
US 2011/0255451 A1    Oct. 20, 2011

Related U.S. Application Data

(60) Provisional application No. 61/140,055, filed on Dec. 22, 2008, provisional application No. 61/141,659, filed on Dec. 30, 2008, provisional application No. 61/141,660, filed on Dec. 30, 2008, provisional application No. 61/142,600, filed on Jan. 5, 2009.

(30) Foreign Application Priority Data

Aug. 24, 2009    (KR) .................. 10-2009-0078412
Aug. 24, 2009    (KR) .................. 10-2009-0078413

(51) Int. Cl.
*H04L 5/00*    (2006.01)
*H04L 5/14*    (2006.01)

(52) U.S. Cl.
CPC .......... *H04L 5/0007* (2013.01); *H04L 5/0064* (2013.01); *H04L 5/1469* (2013.01)

(58) Field of Classification Search
None
See application file for complete search history.

(56) References Cited

U.S. PATENT DOCUMENTS 7,466,985 B1 * 12/2008 Handforth et al. ............ 370/312
8,204,025 B2 *  6/2012 Cai et al. ...................... 370/337
(Continued)

FOREIGN PATENT DOCUMENTS

CN    1368798    9/2002
CN    1525674    9/2004
(Continued)

OTHER PUBLICATIONS

X. Zhuang et al., "Ranging Improvement for 802.16e OFDMA PHY," IEEE 802.16 Broadband Wireless Access Working Group, IEEE C802.16e-04/143, Jun. 2004.
(Continued)

*Primary Examiner* — Chirag Shah
*Assistant Examiner* — Joshua Smith
(74) *Attorney, Agent, or Firm* — Lee, Hong, Degerman, Kang & Waimey

(57) ABSTRACT

A method and apparatus for transmitting data using a frame in a broadband wireless communication system are disclosed. The method for transmitting and receiving data in a broadband wireless communication system includes: setting a data frame for transmitting and receiving data through uplink and downlink; and transmitting and receiving data through the set data frame, wherein the data frame includes one or more first subframes and one or more second subframes including a different number of data symbols from that of data symbols of the first subframe.

1 Claim, 12 Drawing Sheets

(56) References Cited

U.S. PATENT DOCUMENTS

| | | | |
|---|---|---|---|
| 2004/0081131 A1 | 4/2004 | Walton et al. | |
| 2004/0190440 A1 | 9/2004 | Kim et al. | |
| 2005/0099936 A1 | 5/2005 | Fujii et al. | |
| 2005/0192011 A1* | 9/2005 | Hong et al. | 455/440 |
| 2005/0208945 A1 | 9/2005 | Hong et al. | |
| 2005/0259629 A1 | 11/2005 | Oliver et al. | |
| 2006/0120271 A1 | 6/2006 | Yu et al. | |
| 2006/0167964 A1 | 7/2006 | Balakrishnan et al. | |
| 2007/0058595 A1 | 3/2007 | Classon et al. | |
| 2007/0165566 A1 | 7/2007 | Khan et al. | |
| 2007/0183306 A1* | 8/2007 | Akita et al. | 370/208 |
| 2007/0258358 A1 | 11/2007 | Cho et al. | |
| 2007/0268846 A1 | 11/2007 | Proctor, Jr. et al. | |
| 2007/0280098 A1 | 12/2007 | Bhatt et al. | |
| 2007/0280188 A1 | 12/2007 | Kang et al. | |
| 2007/0287449 A1 | 12/2007 | Ju et al. | |
| 2008/0039107 A1 | 2/2008 | Ma et al. | |
| 2008/0062914 A1 | 3/2008 | Olfat | |
| 2008/0075032 A1 | 3/2008 | Balachandran et al. | |
| 2008/0080476 A1* | 4/2008 | Cho et al. | 370/350 |
| 2008/0095195 A1* | 4/2008 | Ahmadi et al. | 370/478 |
| 2008/0107047 A1 | 5/2008 | Olfat | |
| 2008/0123569 A1* | 5/2008 | Doss et al. | 370/280 |
| 2008/0130620 A1 | 6/2008 | Liu et al. | |
| 2008/0175215 A1 | 7/2008 | Oh et al. | |
| 2008/0182543 A1 | 7/2008 | Yang et al. | |
| 2009/0059845 A1 | 3/2009 | Cooper et al. | |
| 2009/0080385 A1* | 3/2009 | Kim et al. | 370/336 |
| 2009/0109890 A1 | 4/2009 | Chow et al. | |
| 2009/0122777 A1 | 5/2009 | Tao et al. | |
| 2009/0185483 A1 | 7/2009 | McBeath et al. | |
| 2009/0185632 A1 | 7/2009 | Cai et al. | |
| 2009/0252096 A1* | 10/2009 | Liu et al. | 370/329 |
| 2010/0054172 A1* | 3/2010 | Boariu et al. | 370/315 |
| 2011/0044256 A1* | 2/2011 | Chang et al. | 370/329 |
| 2011/0116485 A1 | 5/2011 | Olszewski et al. | |

FOREIGN PATENT DOCUMENTS

| | | |
|---|---|---|
| CN | 1964222 | 5/2007 |
| CN | 101005304 | 7/2007 |
| CN | 101009512 | 8/2007 |
| CN | 101026468 | 8/2007 |
| CN | 101542942 | 9/2009 |
| KR | 10-0821843 | 4/2008 |
| RU | 2005115879 | 1/2006 |
| RU | 2304357 | 8/2007 |
| WO | 03/047117 | 6/2003 |
| WO | 2007/069329 | 6/2007 |
| WO | 2007/074525 | 7/2007 |
| WO | 2007/144947 | 12/2007 |
| WO | 2009/102182 | 8/2009 |

OTHER PUBLICATIONS

J. Zyren et al., "Overview of the 3GPP Long Term Evolution Physical Layer," Freescale Semiconductor, Jul. 2007.
Russian Federation for Intellectual Property Application Serial No. 2011125596/07, Notice of Allowance dated Oct. 31, 2012, 17 pages.
U.S. Appl. No. 13/131,600, Office Action dated May 2, 2013, 13 pages.
The State Intellectual Property Office of the People's Republic of China Application Serial No. 200980151718.8, Office Action dated May 6, 2013, 6 pages.
State Intellectual Property Office of the People's Republic of China Application Serial No. 200980153490.6, Office Action dated Jul. 2, 2013, 7 pages.
Intellectual Property Corporation of Malaysia Application Serial No. PI2010003391, Office Action dated Nov. 6, 2014, 3 pages.
Korean Intellectual Property Office Application U.S. Appl. No. 10-2010-7015108, Notice of Allowance dated May 17, 2015, 3 pages.
RAN WG5, ZTE (Rapporteur), "TR 34.943 on Analysis of Differences between FDD and 128 Mcps TDD," 3GPP TSG RAN Meeting #28, RP-050265, Jun. 2005, 248 pages.
Murias, "IEEE 802.16m Amendment Working Document," IEEE 802.16 Broadband Wireless Access Working Group, IEEE 802.16m-08/050, Dec. 2008, 31 pages.
Intellectual Property Office of India Application U.S. Appl. No. 2844/KOLNP/2010, Office Action dated Jul. 6, 2015, 2 pages.

* cited by examiner

METHOD AND APPARATUS FOR DATA TRANSMISSION USING A DATA FRAME

CROSS-REFERENCE TO RELATED APPLICATIONS

This application is the National Stage filing under 35 U.S.C. 371 of International Application No. PCT/KR2009/007646, filed on Dec. 21, 2009, which claims the benefit of earlier filing date and right of priority to Korean Application Nos. 10-2009-0078412, filed on Aug. 24, 2009, and 10-2009-0078413, filed on Aug. 24, 2009, and U.S. Provisional Application Ser. Nos. 61/142,600, filed on Jan. 5, 2009, 61/141,660, filed on Dec. 30, 2008, 61/141,659, filed on Dec. 30, 2008, and 61/140,055, filed on Dec. 22, 2008, the contents of all of which are incorporated by reference herein in their entireties.

TECHNICAL FIELD

The present invention relates to a common frame structure applicable to various bandwidths and a method and apparatus for transmitting and receiving data using the same.

BACKGROUND ART

In line with a communication technique, services provided by a mobile communication system is growingly evolving into diversification of a packet data transmission/reception service for transmitting a large quantity of data, a multimedia broadcast service, and the like, as well as a voice communication service.

A third-generation communication service such as WCDMA, currently on service, allows for a transmission and reception of a large quantity of data, as well as voice data, at a high transfer rate, and in order to create an evolved network having a broader bandwidth in consideration of an anticipated rapid increase in data traffic, standardizations of a long-term evolution (LTE) network, IEEE802.16m, and the like, are being actively ongoing.

In particular, the IEEE 802.16m is aimed at developing a standard that can satisfy the requirements of an IMT-Advanced system while maintaining compatibility with the existing 802.16 standard-based terminal (or user equipment) and base station equipment.

The thusly evolved IMT-Advanced communication system is a broadband wireless access communication system, featuring that it has an extensive service area and supports a fast transfer rate. In order to support a broadband transmission network at a physical channel, the broadband wireless access communication system employs orthogonal frequency division multiplexing (OFDM) and orthogonal frequency division multiplexing access (OFDMA). In the OFDM/OFDMA schemes, a physical channel signal is transmitted and received by using a plurality of subcarriers, thus enabling high speed data communication.

FIG. 1 illustrates an uplink (UL) and downlink (DL) frame structure of a broadband wireless access communication system employing the OFDM/OFDMA schemes.

With reference to FIG. 1, the uplink and downlink frame structure includes areas of a preamble 101, a frame control header (FCH) 102, a DL-MAP 103, a UL-MAP 104, and a plurality of data burst areas.

A preamble sequence, a synchronous signal, for acquiring mutual synchronization between the base station and the terminal is transmitted through the preamble 101 area, channel allocation information and channel code information related to the DL-MAP 103 are provided through the FCH 102 area, and channel allocation information of a data burst in downlink and uplink is provided through the DL/UL-MAP 103 and 104 area. A guard time for discriminating the frames is inserted between an uplink frame and a downlink frame. A TTG (Transmit/received Transition Gap) is a guard time between downlink bursts and subsequent uplink bursts. An RTG (Receive/transmit Transition Gap) is a guard time between the uplink bursts and subsequent downlink bursts.

The IMT-Advanced system is required to support various bandwidths, and in particular, IEEE802.16m, whose standardization is currently proceeding, defines bandwidths such as 5 MHz, 7 MHz, 8.75 MHz, 10 MHz, 20 MHz, etc., as bandwidths of a system channel. However, currently, the IMT-Advanced system does not define a substantial frame structure, and in particular, in case of IEEE802.16m, if frames are individually designed for the respective bandwidths, the system complexity would increase. In addition, the frame structure differs when the length of the cyclic prefix (CP) of the frame is variably configured, and in this case, when a single communication system uses both frame structures each having a different CP length, a problem arises in that the interference between neighboring cells occurs.

TECHNICAL GIST OF THE PRESENT INVENTION

Therefore, it is an object of the present invention to provide a frame structure that can be commonly applicable to various bandwidths required by a system, and a method and apparatus for transmitting and receiving data through the frame structure.

To achieve the above object, there is provided a method for transmitting data in a broadband wireless communication system, including: setting a data frame for transmitting and receiving data through uplink and downlink; and transmitting and receiving data through the set data frame, wherein the data frame includes one or more first subframes and one or more second subframes including a different number of data symbols from that of data symbols of the first subframe.

The first subframe may be configured to include six data symbols as one unit, the second subframe may be configured to include five data symbols as one unit, and the data frame may be configured such that the number of the first subframes is maximized.

To achieve the above object, there is also provided an apparatus for transmitting and receiving data, including: a transceiver configured to transmit and receive data through downlink and uplink; and a controller configured to set a data frame including one or more first subframes and one or more second subframes including a different number of data symbols from that of data symbols of the first subframe and control the transceiver to transmit and receive data through the set data frame, wherein the controller configures the data frame such that the number of the first subframes is maximized.

To achieve the above object, there is also provided a method for transmitting data in a time division duplex (TDD) type orthogonal frequency division multiplexing access (OSDMA) communication system, including: setting a data frame including a plurality of subframes; and transmitting data through the set data frame, wherein the cyclic prefix (CP) of the data frame is 1/16 of the length of a valid OFDMA symbol, the bandwidth of a transport channel is 7 MHz, and the data frame is configured such that the number of subframes configured to include six data symbols as one unit is maximized.

The ratio of the subframes of the downlink and uplink of the data frame may be K:J, the number of data symbols allocated to the downlink may be 6*K−1, the number of data symbols allocated to the uplink may be 6*J, one data symbol may be allocated to TTG (Transmit/receive Transition Gap), and the last subframe of the downlink may be configured to include five symbols as one unit.

The ratio of the subframes of the downlink and uplink of the data frame may be 5:1, first to fourth subframes of the downlink and subframes of the uplink may be configured to include six symbols as one unit, and the fifth subframe of the downlink may be configured to include five symbols as one unit.

To achieve the above object, there is also provided a method for transmitting data in a frequency division duplex (FDD) type orthogonal frequency division multiplexing access (OSDMA) communication system, including: setting a data frame including a plurality of subframes; and transmitting data through the set data frame, wherein the cyclic prefix (CP) of the data frame is 1/16 of the length of a valid OFDMA symbol, a bandwidth of a transport channel is 7 MHz, and the data frame is configured to include only subframes including six data symbols as one unit.

To achieve the above object, there is also provided an apparatus for transmitting and receiving data, including: a transceiver configured to transmit and receive data through downlink and uplink; and a controller configured to set a data frame including one or more subframes having n number of data symbols and control the transceiver to transmit and receive data through the set data frame, wherein the controller configures the data frame such that the number of the subframes is maximized.

The cyclic prefix (CP) of the data frame may be 1/16 of the length of a valid OFDM symbol, the bandwidth of a transport channel may be 7 MHz, and the data symbol unit 'n' of the subframe may be 6.

According to exemplary embodiments of the present invention, a frame structure that can be commonly applicable to a system required to support various bandwidth is provided, the problem in that a system complexity increases can be prevented.

In addition, in the TDD type data frame, an interference between downlink and uplink of frames each having a different CP length can be prevented, and an FDD frame having common characteristics as those of the TDD frame structure can be provided.

MODE FOR CARRYING OUT THE PREFERRED EMBODIMENTS

Figure 1:
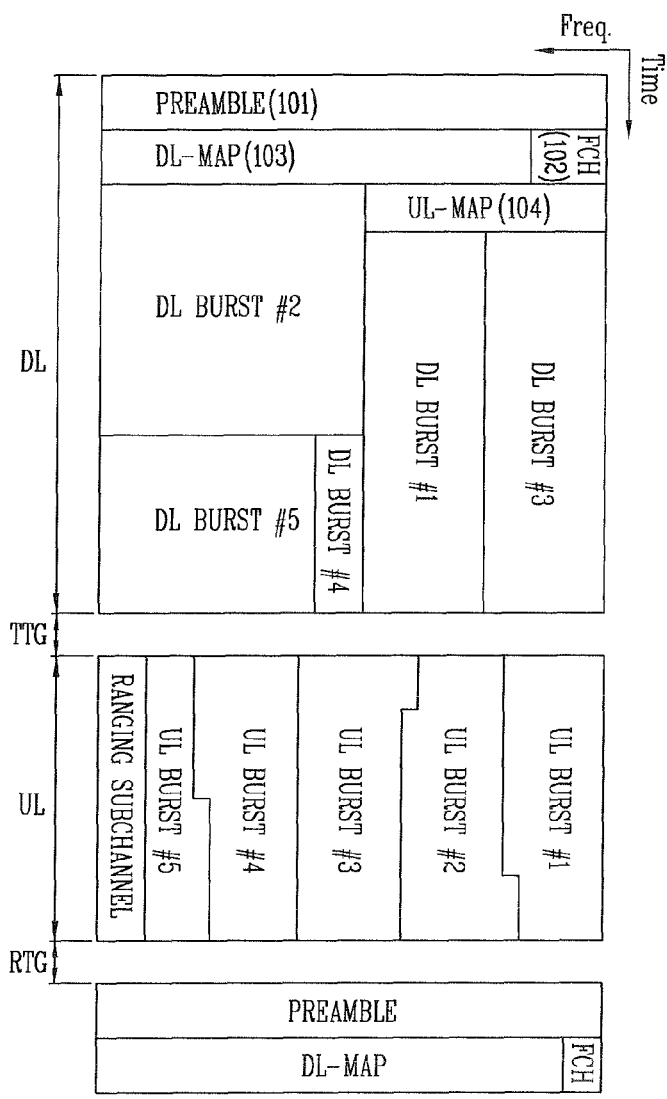
FIG. 1 is a view schematically showing an uplink and downlink frame structure of a broadband wireless access communication system.

Exemplary embodiments of the present invention will now be described in detail with reference to the accompanying drawings. The same reference numerals will be used throughout to designate the same or like components and a repeated description will be omitted. In describing the present invention, if a detailed explanation for a related known function or construction is considered to unnecessarily divert the gist of the present invention, such explanation will be omitted but would be understood by those skilled in the art. In the drawings, the shapes and dimensions may be exaggerated for clarity, and the same reference numerals will be used throughout to designate the same or like components. The accompanying drawings, which are given by illustration only, and thus are not limitative of the present invention.

The terminal according to an exemplary embodiment of the present invention may also be referred to as subscriber station (SS), user equipment (UE), mobile equipment (ME), mobile station (MS), and the like. Also, the terminal may be a portable device having a communication function such as a mobile phone, a PDA, a smartphone, a notebook, and the like, or a non-portable device such as a PC or a vehicle-mounted device.

Figure 2:
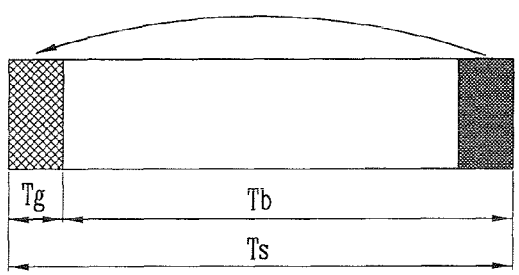
FIG. 2 is a view schematically showing an OFDM/OFDMA symbol structure used in an exemplary embodiment of the present invention.

FIG. 2 is a view schematically showing an OFDM/OFDMA symbol structure used in an exemplary embodiment of the present invention.

In the OFDM/OFDMA scheme, a certain interval before each symbol is used as a guard interval which is not in use in consideration of the influence of an inter-symbol interface (ISI) due to a reflective wave, and as illustrated, a portion of the rear of a symbol is duplicated as the guard interval and inserted. The front portion of the symbol inserted in the guard interval is called a cyclic prefix (CP).

When the overall length of one OFDM symbol is Ts and the length of the CP is Tg, the length of the valid OFDM symbol is Tb obtained by excluding the length of CP from the overall length of the OFDM symbol Ts.

As for the frame structure configured as the OFDM/OFDMA symbol, the frame size and the number of subframes and symbols may be determined according to frame parameters as shown in Table 1 below:

The frame may include a plurality of TTI (Transmission Time Interval), and the TTI is a basic unit of scheduling performed in a MAC (Medium Access Control) layer, and also a radio resource allocation unit.

A frame includes at least one subframe, and the size of a subframe is determined by symbols. In an exemplary embodiment of the present invention, subframes are defined as a total four types of subframes: Type-1, Type-2, Type-3, and Type-4.

TABLE 1

| | | | 5 | 7 | 8.75 | 10 | 20 |
|---|---|---|---|---|---|---|---|
| Nominal Channel Bandwidth (MHz) | | | | | | | |
| Over-sampling Factor | | | 28/25 | 8/7 | 8/7 | 28/25 | 28/25 |
| Sampling Frequency (MHz) | | | 5.6 | 8 | 10 | 11.2 | 22.4 |
| FFT size | | | 512 | 1024 | 1024 | 1024 | 2048 |
| Sub-Carrier Spacing (KHz) | | | 10.937500 | 7.812500 | 9.765625 | 10.937500 | 10.937500 |
| Useful symbol Time Ts (μs) | | | 91.429 | 128 | 102.4 | 91.429 | 91.429 |
| Cyclic Prefix (CP) $T_g = 1/8$ $T_u$ | Symbol Time $T_s$ (μs) | | 102.857 | 144 | 115.2 | 102.857 | 102.857 |
| | FDD | Number of OFDM symbols per Frame | 48 | 34 | 43 | 48 | 48 |
| | | Idle time (μs) | 62.857 | 104 | 46.40 | 62.857 | 62.857 |
| | TDD | Number of OFDM symbols per Frame | 47 | 33 | 42 | 47 | 47 |
| | | TTG + RTG (μs) | 165.714 | 248 | 161.6 | 165.714 | 165.714 |
| Cyclic Prefix (CP) $T_g = 1/16$ $T_u$ | Symbol Time $T_s$ (μs) | | 97.143 | 136 | 108.8 | 97.143 | 97.143 |
| | FDD | Number of OFDM symbols per Frame | 51 | 36 | 45 | 51 | 51 |
| | | Idle time (μs) | 45.71 | 104 | 104 | 45.71 | 45.71 |
| | TDD | Number of OFDM symbols per Frame | 50 | 35 | 44 | 50 | 50 |
| | | TTG + RTG (μs) | 142.853 | 240 | 212.8 | 142.853 | 142.853 |
| Cyclic Prefix (CP) $T_g = 1/4$ $T_u$ | Symbol Time $T_s$ (μs) | | 114.286 | 160 | 128 | 114.286 | 114.286 |
| | FDD | Number of OFDM symbols per Frame | 43 | 31 | 39 | 43 | 43 |
| | | Idle time (μs) | 85.694 | 40 | 8 | 85.694 | 85.694 |
| | TDD | Number of OFDM symbols per Frame | 42 | 30 | 38 | 42 | 42 |
| | | TTG + RTG (μs) | 199.98 | 200 | 136 | 199.98 | 199.98 |

When a transport channel band and a CP length of the system are determined with reference to Table 1, the number of OFDM symbols and other required parameters for designing a frame can be determined.

The frame structure will now be described in detail with reference to the accompanying drawings.

Figure 3:
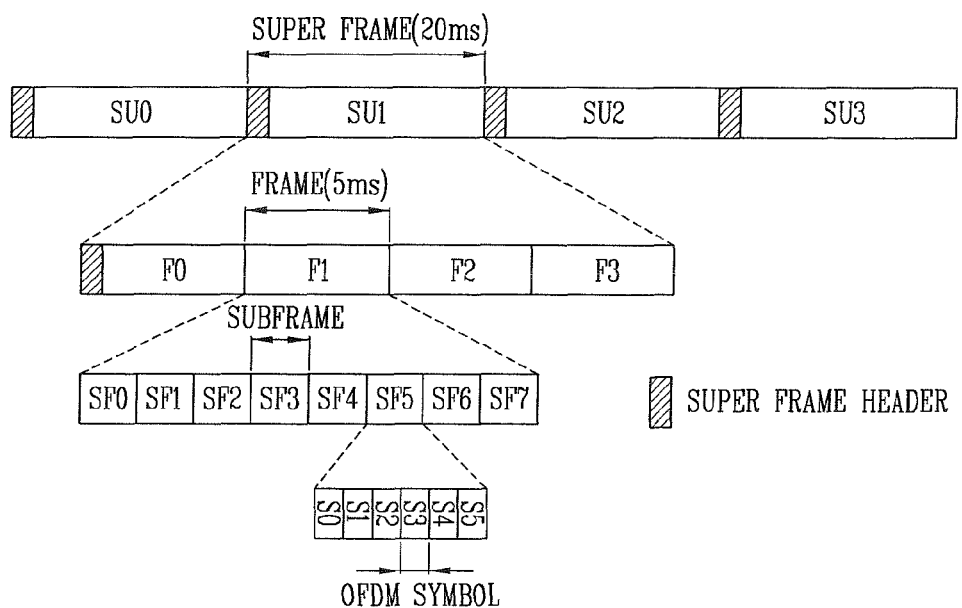
FIG. 3 is a view schematically showing a frame structure of an upper level according to an exemplary embodiment of the present invention.

FIG. 3 is a view schematically showing a frame structure of an upper level according to an exemplary embodiment of the present invention.

As illustrated in FIG. 3, the frame structure applied to the system according to an exemplary embodiment of the present invention is includes 5-ms frame as a basic element, and the frame, which is a basic single transmission unit, may be defined as an interval between preambles.

The Type-1 subframe includes six OFDM symbols. The Type-2 subframe includes seven OFDM symbols. The Type-3 subframe includes five OFDM symbols. The Type-4 subframe includes nine OFDM symbols.

As shown, a superframe including a plurality of frames are formed, and in this case, the superframe may be configured by, for example, 20 ms. When the superframe is configured, system configuration information for an initial fast cell selection and low latency service its transmission unit and broadcast information are set as transmission units, and in general, two to six frames are configured as a single superframe. Also, a single frame by 5 ms includes a plurality of subframes, and each subframe includes a plurality of OFDM/OFDMA symbols. Each superframe includes one superframe header (SFH)

including a broadcast channel, and the SFH is positioned at a first downlink (DL) subframe of the corresponding superframe.

The frame structure may be designed according to the bandwidth of a system channel, a duplex scheme, a CP length, and the like.

Figure 4:
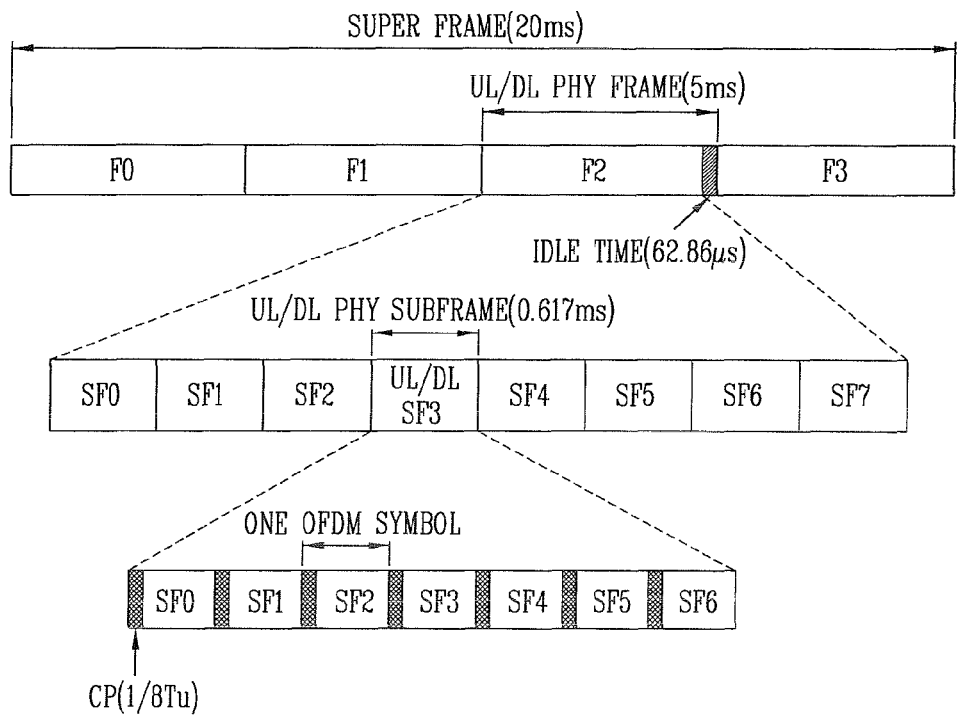
FIG. 4 is a view schematically showing an FDD type frame structure according to an exemplary embodiment of the present invention.

FIG. 4 is a view schematically showing an FDD type frame structure according to an exemplary embodiment of the present invention.

In an FDD mode, downlink and uplink transmissions are discriminated on a frequency domain, and every subframe of each frame may be transmitted via uplink and downlink. A terminal in the FDD mode may receive a data burst with a certain downlink subframe while accessing an uplink subframe simultaneously.

FIG. 4 defines a frame structure in the FDD mode when channel bandwidths are 5 MHz, 10 MHz, and 20 MHz and a CP length is ⅛ Tb. 20 ms superframe includes four 5 ms frames F0, Fl, F2, and F3, and one frame F2 includes eight subframes SF0, SF1, SF2, SF3, SF4, SF5, SF6, and SF7 each having a length of 0.617 ms and an idle time interval of 62.86 μs. Each subframe is configured as a Type-2 subframe including seven OFDM symbols S0, S1, S2, S3, S4, S5, and S6.

Figure 5:
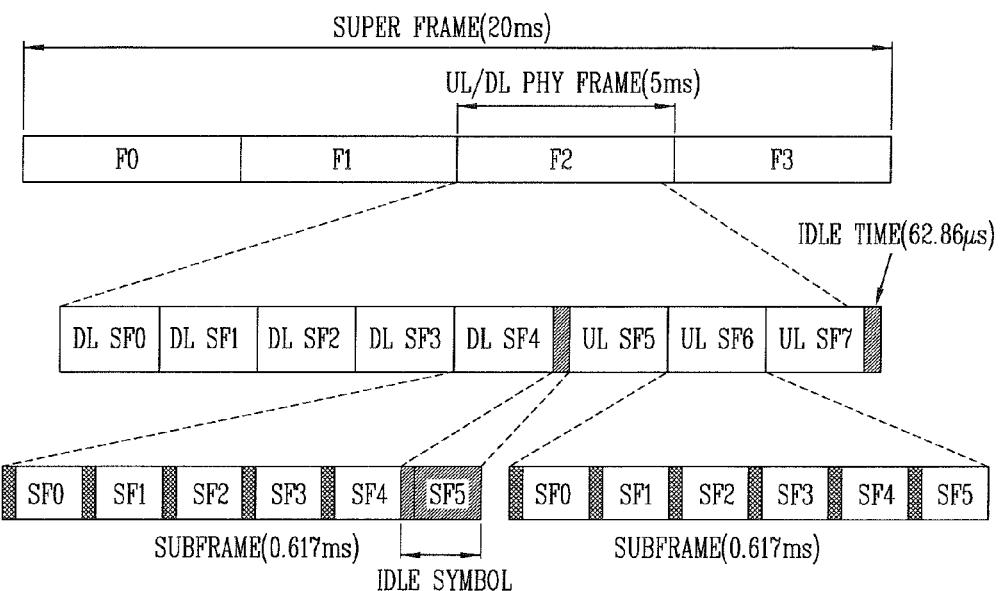
FIG. 5 is a view schematically showing an TDD type frame structure according to an exemplary embodiment of the present invention.

FIG. 5 is a view schematically showing an TDD type frame structure according to an exemplary embodiment of the present invention.

In a TDD mode, downlink and uplink transmissions are discriminated on a time domain. As an uplink transmission time interval is allocated after a downlink transmission time interval, data is transmitted or received via downlink or uplink.

Likewise as in FIG. 4, in FIG. 5, a TDD mode frame structure is defined when channel bandwidths are 5 MHz, 10 MHz, and 20 MHz and a CP length is ⅛ Tb. 20 ms superframe includes four 5 ms frames F0, F1, F2, and F3, and one frame F2 includes eight subframes SF0, SF1, SF2, SF3, SF4, SF5, SF6, and SF7 each having a length of 0.617 ms and an idle time interval of 62.86 μs. The frame F2 includes D number of continuous downlink frames and U number of continuous uplink frames determined according to the ratio of downlink and uplink (D:U). When the ratio of DL and UL is 5:3, five subframes SF0, SF1, SF2, SF3 and SF4 are configured as DL frames, and three subframes SF5, SF6, and SF7 are configured as uplink frames. A single idle symbol for discriminating the DL and UL is inserted between the last downlink subframe SF4 and the first uplink subframe SF5 to inform about switching from DL to UL. The gap inserted between the downlink and uplink is called a TTG (Transmit Transition Gap) and the gap inserted between the uplink and downlink and uplink is called an RTG (Receive Transition Gap), by which a transmission end and a reception end can discriminate a downlink transmission and an uplink transmission.

As shown in FIG. 5, the last downlink subframe SF4 includes five OFDM symbols and the last one idle symbol S5, and in this case, the idle symbol S5 serves as a TTG discriminating the DL and the UL.

Figure 6:
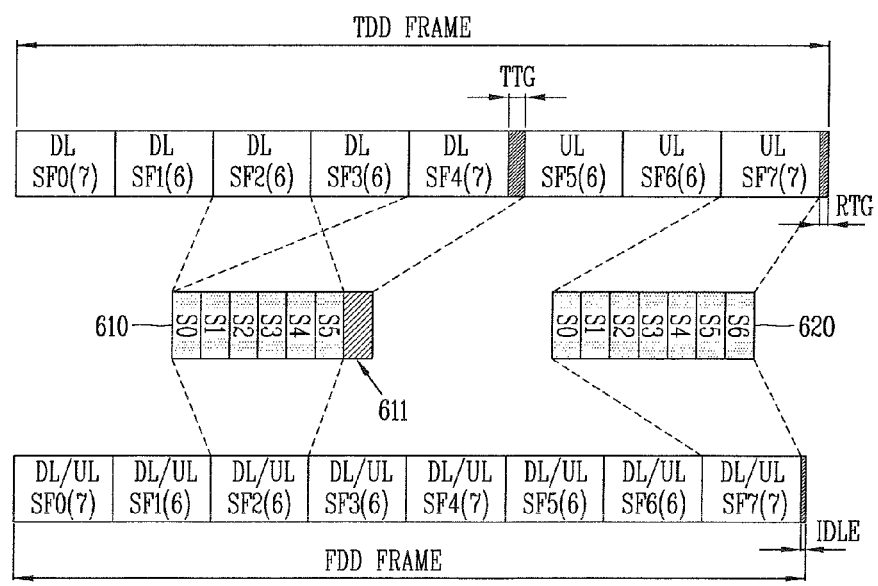
FIG. 6 is a view showing TDD and FDD frame structures according to another exemplary embodiment of the present invention.

FIG. 6 is a view showing TDD and FDD frame structures according to another exemplary embodiment of the present invention.

The frame structure illustrated in FIG. 6 is a case where it is assumed that a CP length is 1/16 Tb and transport channel bandwidths are 5 MHz, 10 MHz, and 20 MHz. In case of the TDD frame, it is assumed that the ratio of DL and UL is 5;3 and the length of the TDD/FDD frame is basically 5 ms. The number of OFDM symbols within one frame (TDD frame or FDD frame) is a total of 48, and one frame includes a total of eight subframes. Thus, unlike the case illustrated in FIGS. 4 and 5, the subframes cannot be all configured as the same type. Namely, the subframes are configured as a Type-1 subframe 610 including six OFDM symbols and a Type-2 subframe 620 including seven OFDM symbols.

The Type-1 subframe 610 includes six OFDM symbols and has a length of 0.583 ms. The Type-2 subframe 620 includes seven OFDM symbols and has a length of 0.680 ms. The TDD frame and the FDD frame have the same size and same subframe configuration, but in case of the TDD frame, because a TTG is required between the DL and UL, the last symbol of the fifth subframe SF4 is configured as an idle symbol 611.

As described above, in the channel bandwidths of 5 MHz, 10 MHz, and 20 MHz, the frame structure is configured such that the Type-1 subframe including six symbols is a basic subframe and also configured such that the number of basic subframes (Type-1 subframes) is maximized. Because the frame structure is configured such that the number of the basic subframes is maximized, when data is transmitted and received b using frames between the transmission end and the reception end, the minimum size of the TTI, the basic unit, is the subframe, so the same configuration and design of the pilot and resource block of the physical layer (PHY) can be used to its maximum level.

Hereinafter, the TDD and FDD frame structures when the channel bandwidth is 7 MHz and a CP length is ⅛ Tb will now be described.

Figure 7:
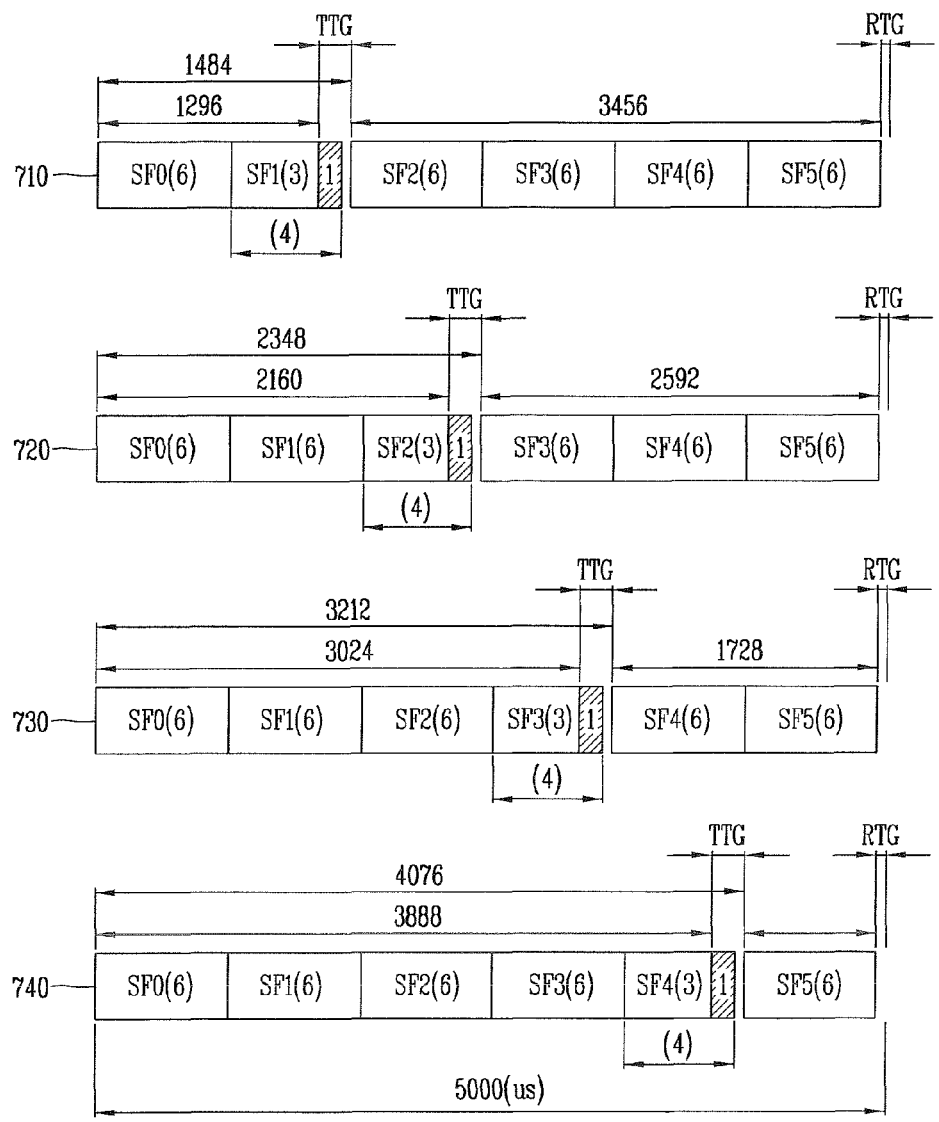
FIG. 7 is a view showing a TDD frame structure according to another exemplary embodiment of the present invention.

FIG. 7 is a view showing a TDD frame structure according to another exemplary embodiment of the present invention.

With reference to Table 1, 34 OFDM symbols are available for the bandwidth of 7 MHz and ⅛ Tb. In the basic frame structure of 5 MHz, 10 MHz, and 20 MHz, the Type-1 subframe including six symbols is used as the basic subframe, and the present exemplary embodiment proposes the frame structure using the Type-1 subframes including six symbols as many as possible. In FIG. 7, one frame includes six subframes, and the Type-1 subframe including six symbols is used as many as possible, 30 symbols (6*5) can be configured and four symbols remain. In the TDD structure, when one symbols is left for a TTG, three symbols remain, so a subframe including three symbol units can be configured. The subframe including three symbol units is defined as a mini-subframe. The structure of the physical layer (PHY) for the Type-1 subframe including six symbols can be discriminated by three symbols, so when the mini-subframe is configured, a portion of the existing PHY structure can be utilized. Alternatively, a Type-4 subframe including nine symbols can be configured by combining the mini-subframe with the Type-1 subframe including six symbols. When a frame is configured with the Type-4 subframes, it can be configured in the frame structures 720, 730 and 740, excluding the frame structure 710 in FIG. 7.

In the TDD mode, the first subframe is used as the super frame header (SFH), so preferably, the Type-1 subframe including six symbols is configured as the first subframe of the frame. Thus, as illustrated, the ratio of DL and UL available in the TDD mode may include the four types of frames 710, 720, 730, and 740 as 2:4, 3:3, 4:2, and 5:1.

Among them, the last subframe of DL is configured as the mini-subframe including three symbols as described above, and the last one symbol is allocated for a TTG.

Figure 8:
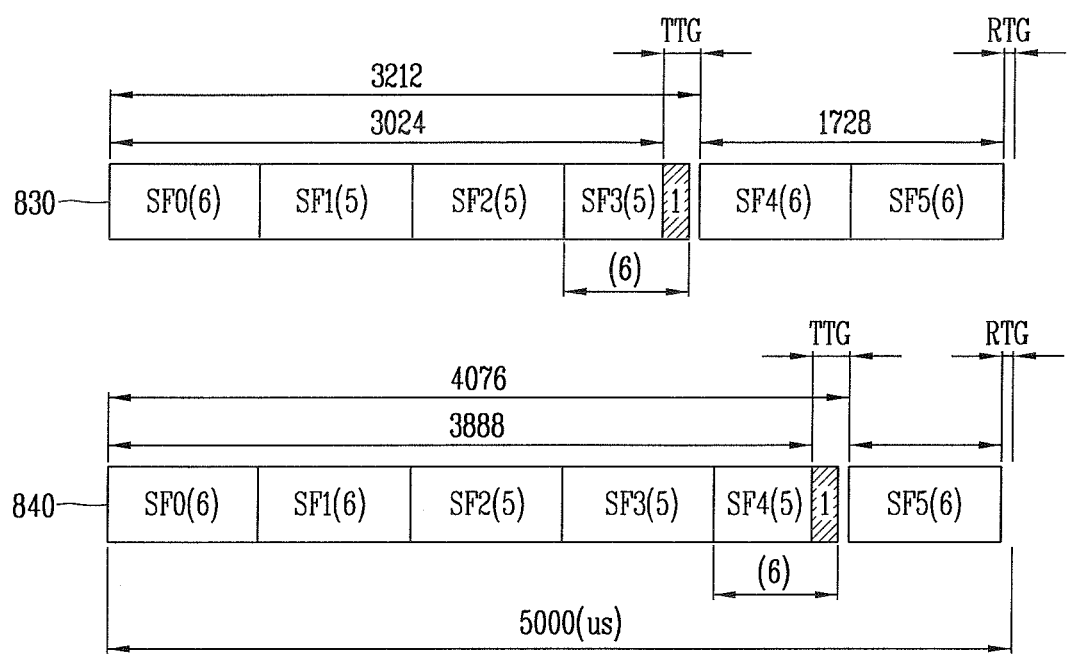
FIG. 8 is a view showing a TDD frame structure according to still another exemplary embodiment of the present invention.

FIG. 8 is a view showing a TDD frame structure according to still another exemplary embodiment of the present invention.

Compared with the exemplary embodiment of FIG. 7 as described above, when the ratio of DL and UL is 4:2 and 5:1, a TDD frame is configured based on the Type-3 subframe including five symbols. In the present exemplary embodiment, when the radio of DL and UL is 2:4, and 3:3, the structure illustrated in FIG. 7 can be used as it is. Thus, a description thereof will be omitted and the case in which the ratio of DL and UL is 4:2 and 5:1 will be described.

As for a TDD frame 830 having a ratio of DL and UL of 4:2, in consideration of the fact that the first subframe is used for the SFH in the TDD mode, the first subframe is configured as the Type-1 basic subframe SF0 including six symbols, the second and third subframes SF1 and SF2 are configured as the Type-3 subframes including five symbols, and the fourth DL subframe SF3 includes a symbol for a TTG, resulting in formation of a Type-3 subframe substantially configured by five symbol units. Thus, the UL subframes SF4 and SF5 are configured as basic subframes of the Type-1 each having six symbols.

As for a TDD frame 840 having a ratio of DL and UL of 5:1, likewise, in consideration of the fact that the first subframe is used for the SFH in the TDD mode, the first subframe is configured as the Type-1 basic subframe SF0 including six symbols, the third and fourth subframes SF1 and SF2 are configured as the Type-3 subframes including five symbols, and the fifth DL subframe SF3 includes a symbol for a TTG, resulting in formation of a Type-3 subframe substantially configured by five symbol units. The UL subframe SF5 is configured as the Type-1 subframe having six symbols. Through such structures, basically, a frame can be configured such that includes the number of Type-1 subframes including six symbols is maximized.

Figure 9:
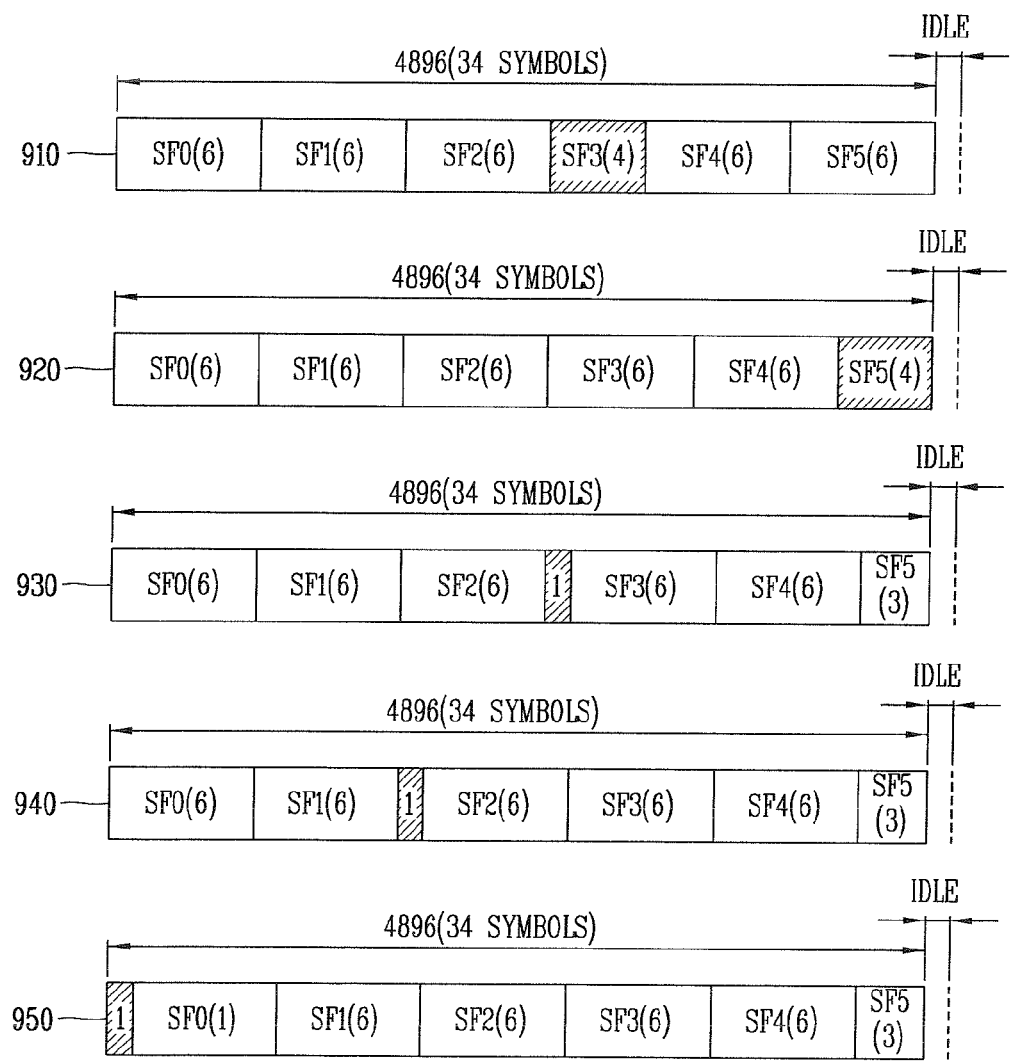
FIG. 9 is a view showing an FDD frame structure according to another exemplary embodiment of the present invention.

FIG. 9 is a view showing an FDD frame structure according to another exemplary embodiment of the present invention.

In the present exemplary embodiment, the Type-1 subframe including six symbols are used as the basic subframe, based on which a frame is configured such that the number of the Type-1 subframes is maximized, and one mini-subframe is added to configured an FDD frame. In case of the FDD frame, unlike the TDD frame, the FDD frame does not need a gap used as the TTG/RTG, so one symbol can be additionally allocated in the frame besides the basic subframes and the mini-subframe.

Referring to the first and second FDD frames 910 and 920, remaining one symbol is added to the mini-subframes SF3 and SF5 to configure the extended mini-subframes SF3 and SF5 including four symbols. The mini-subframes are not limited to the case illustrated in the drawing and also are not limited in its disposition within the frame.

Like the embodiments of 930, 940, and 950 of the FDD frames, one symbol may be inserted in the frame, and a mini-subframe including three symbols may be configured at the end of the frame. In this configuration, the structure of the physical layer (PHY) can be utilized as much as possible by actively using the mini-subframes including three symbols as described above. The remaining one symbol may be positioned behind the second or third subframe, the middle of the frame, or may be positioned at the forefront of the frame so as to be utilized for a transmission of control information by symbol, e.g., additional information such as a preamble and FCH.

In a different exemplary embodiment, the mini-subframe may be combined with the Type-1 subframe including six symbols to configure the Type-4 subframe including nine symbols. When a frame is configured with the Type-4 subframe, the subframe is the Type-4 subframe including nine symbols as the Type-1 subframe SF4 and the mini-subframe SF5 are combined in the frame structures 930, 940, and 950 in FIG. 9.

Figure 10:
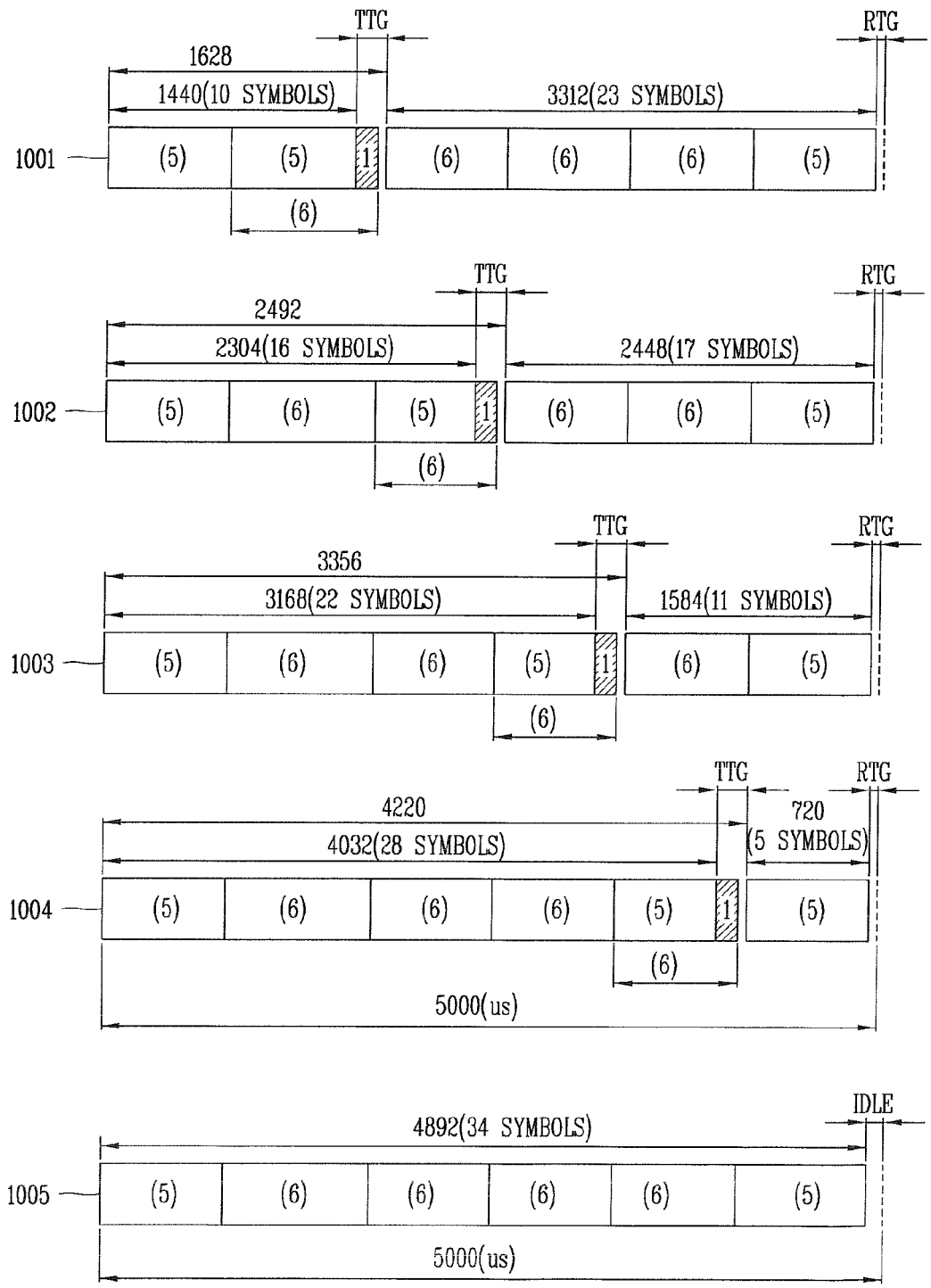
FIG. 10 is a view showing TDD and FDD frame structures according to still another exemplary embodiment of the present invention.

FIG. 10 is a view showing TDD and FDD frame structures according to still another exemplary embodiment of the present invention.

As shown in FIG. 10, in the present exemplary embodiment, among thirty-four symbols constituting one frame, ten symbols are configured as the Type-3 subframes including five symbols and the other remaining twenty-four symbols are configured as the Type-1 subframes including six symbol units. Thus, the Type-3 subframes including six symbol units is a basic subframe unit, so four Type-3 subframes are included in one frame, and two Type-3 subframes including five symbol units are configured, thus obtaining a frame structure in which the number of basic subframes is maximized.

In case of configuring TDD frames 1001, 1002, 1003, and 1004, one symbol is allocated to the TTG interval, so substantially three Type-3 subframes including five symbol units are configured. This is similar to the frame structure in which the CP length is $\frac{1}{16}$ Tb in the bands of 5 MHz, 10 MHz, and 20 MHz. Thus, one Type-3 subframe is allocated to DL and UL, respectively and additionally allocated to the last subframe utilized as the TTG, while a maximum number of Type-1 subframe are configured.

In case of configuring the FDD frame 1005 based on the Type-1 subframe, the FDD frame 1005 includes two Type-3 subframes and four Type-1 subframes by adding one symbol compared with the above-described TDD frames 1001, 1002, 1003, and 1004. The Type-3 subframe may be positioned at the forefront or back as illustrated, but the present invention is not limited thereto.

Figure 11:
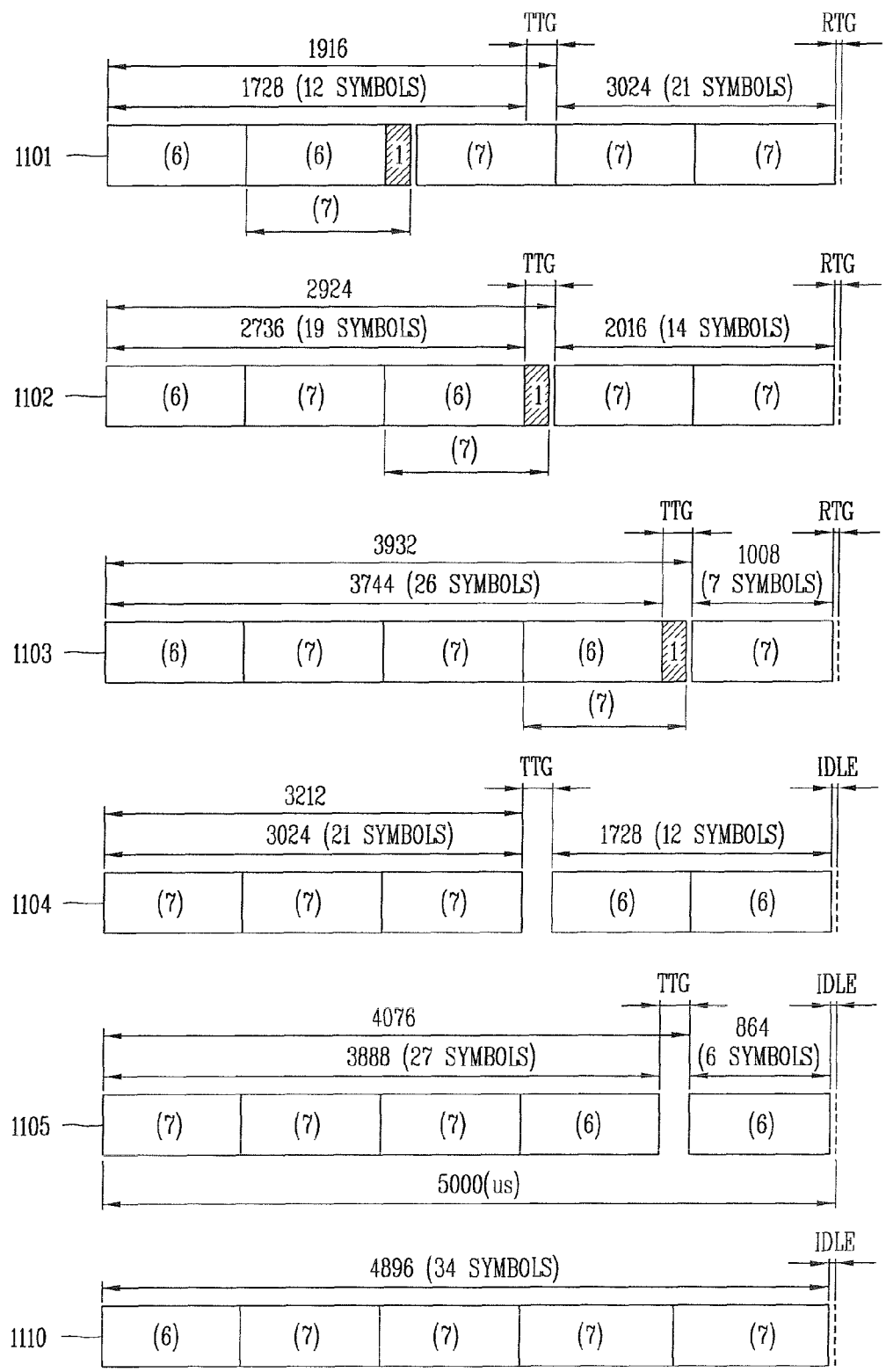
FIG. 11 is a view showing TDD and FDD frame structures according to yet another exemplary embodiment of the present invention.

FIG. 11 is a view showing TDD and FDD frame structures according to yet another exemplary embodiment of the present invention.

In the present exemplary embodiment, a frame is configured based on the Type-2 subframe including seven symbol units.

Among thirty-four symbols constituting one frame, four subframes are configured as the Type-2 subframe including seven symbols, and the other remaining one subframe is configured as the Type-1 subframe including six symbols. In this respect, because one symbol can be utilized as the TTG in the TDD frames 1101, 1102, and 1103, one symbol of the Type-2 subframe is utilized as the TTG and the corresponding subframe is changed to the Type-1 subframe. The TDD frames 1101, 1102, and 1103 features that a frame can be configured only two types of subframes such as the frame structure in the bands of 5 MHz, 10 MHz, and 20 MHz and the existing physical layer (PHY) structure can be utilized in the same manner. Also, the TDD frames have structural features in that the Type-2 subframe can be changed to the Type-1 subframe due to one symbol utilized as the TTG interval so as to be transmitted.

The ratio of DL and UL considered in the TDD frames 1101, 1102, and 1103 is defined as 2:3, 3:2, and 4:1, and the basic subframe may be positioned at the forefront in terms of unification of the size of the SFH, whereby the basic subframe may not be affected by the ratio of the DL and UL.

In addition, when the radio of the DL and UL in the TDD frames 1104 and 1105 is 3:2 and 4:1, the number of symbols of the UL is adjusted by the multiple unit of 6. This is desirous in terms of a legacy support, and thus, the available DL:UL ratio is 3:2 and 4:1. According to circumstances, the TDD frame 1105 in which one subframe of DL is configured a subframe including six symbols and one independent is configured in consideration of the position of the SFH.

The FDD frame 1110 may be configured by using the Type-2 subframe including seven symbol units. Preferably, the first subframe is configured as the Type-1 subframe including six symbols in order to use a SFH design and common characteristics of the different bandwidths (5 MHz, 10 MHz, and 20 MHz). However, the position of the Type-1 subframe is not limited thereto and may be freely disposed in the frame.

Figure 12:
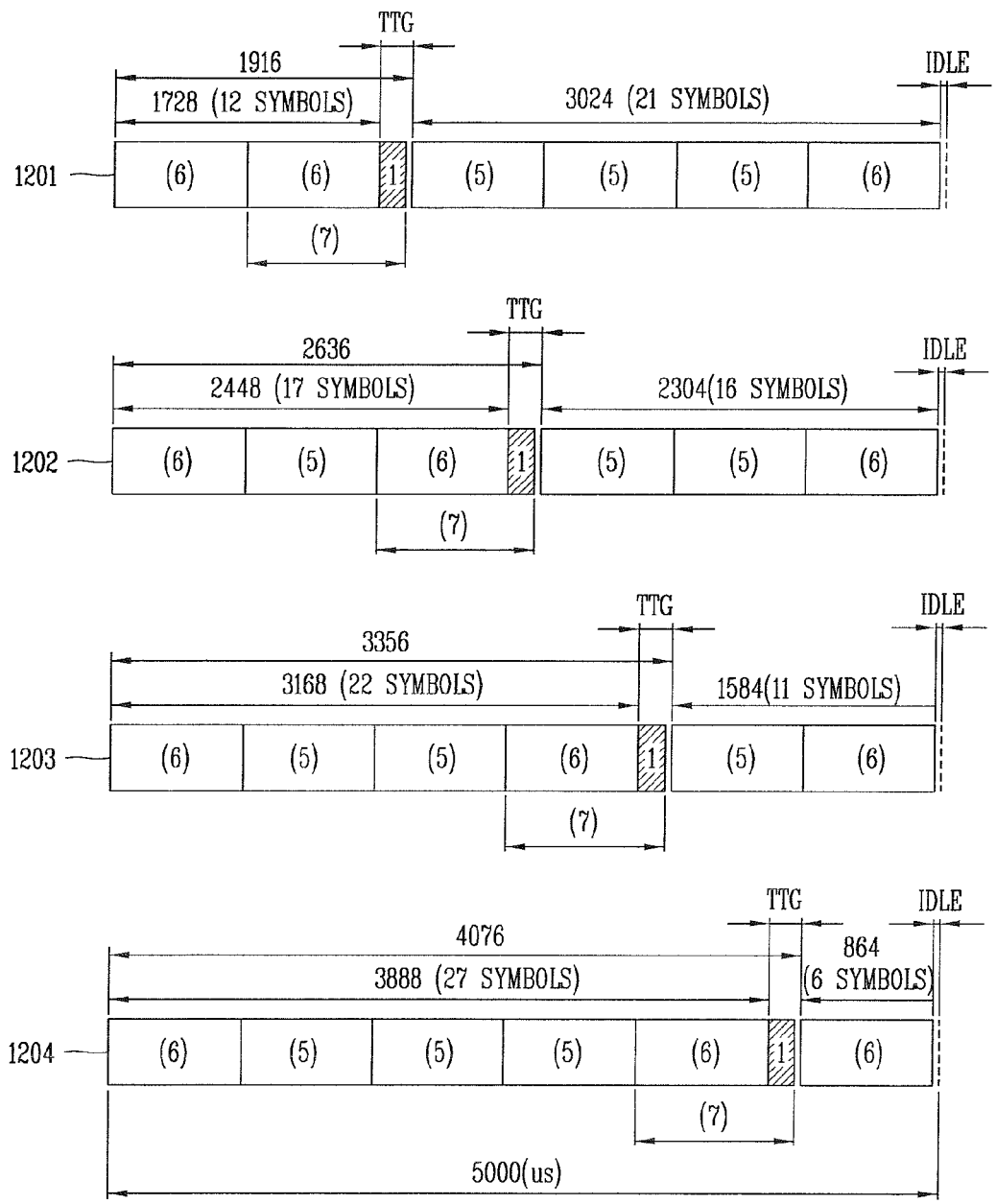
FIG. 12 is a view showing an FDD frame structure according to still another exemplary embodiment of the present invention.

FIG. 12 is a view showing an FDD frame structure according to still another exemplary embodiment of the present invention.

In the present exemplary embodiment, a frame is configured based on the Type-3 subframe including five symbol units. Namely, among thirty-four symbols constituting one frame, fifteen symbols are used to configure three Type-3 subframes and twelve symbols are used to configure two Type-1 subframes and the other remaining seven symbols used to configure Type-2 subframes.

One symbol can be utilized for the TTG in the TDD mode, so the last subframe of the DL related to the TTG interval can be changed to a different subframe type. For example, in the case in which the Type-2 subframe including seven symbol units is disposed as the last subframe of the DL, the Type-2 subframe is changed into the Type-1 subframe due to the TTG interval. In case in which the Type-1 subframe is disposed as the last subframe of the DL, the Type-1 subframe is changed into the Type-3 subframe having five symbol units.

The other remaining matters related to the frame configuration are the same as those described in the above exemplary embodiments, so its detailed description will be omitted.

Figure 13:
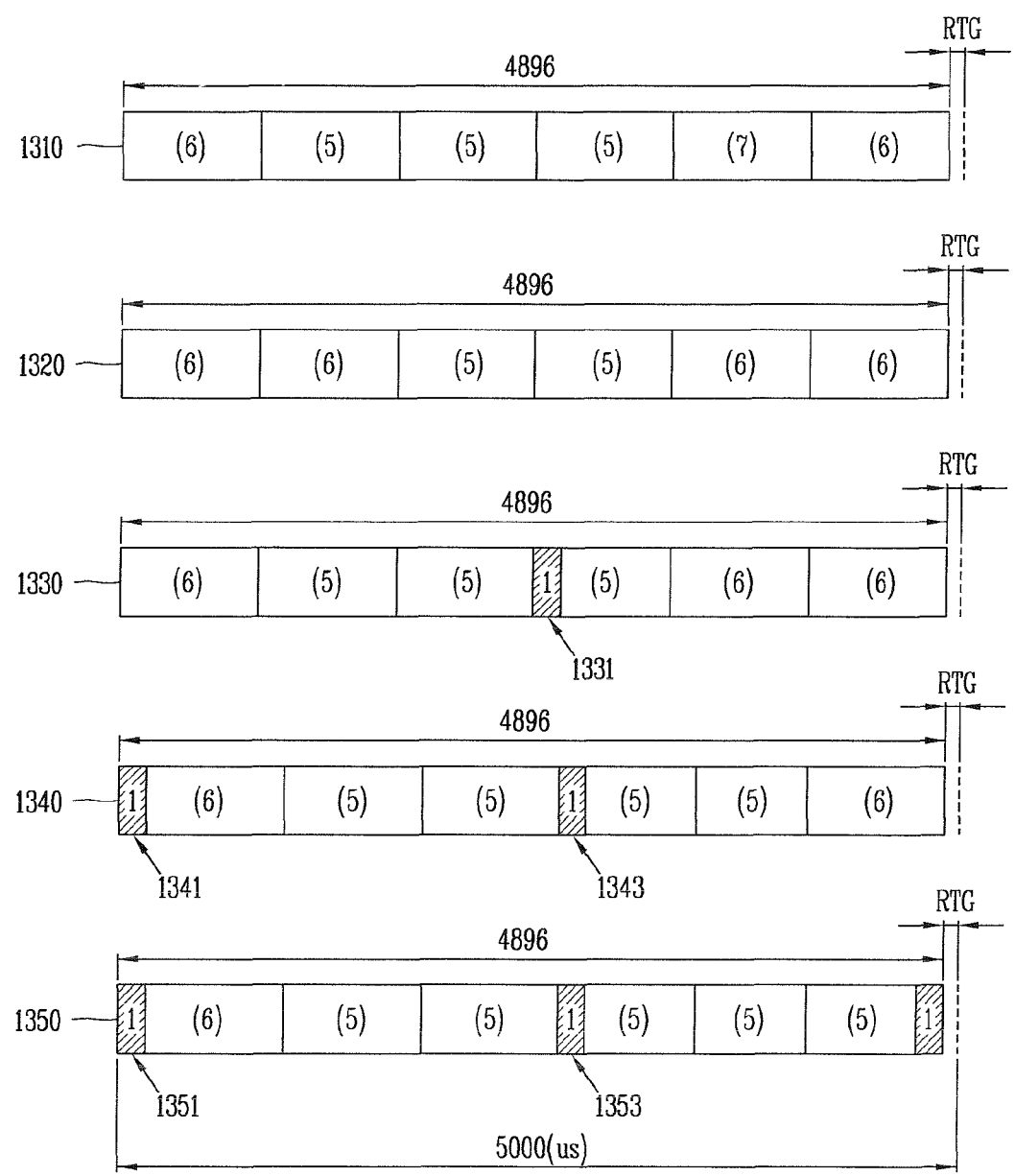
FIG. 13 is a view showing an FDD frame structure according to yet another exemplary embodiment of the present invention.

FIG. 13 is a view showing an FDD frame structure according to yet another exemplary embodiment of the present invention.

In the present exemplary embodiment, an FDD frame is configured based on the Type-3 subframe, likewise as in the case illustrated in FIG. 12. A first FDD frame 1310 includes one additional symbol compared with the TDD frame 1204 illustrated in FIG. 12 because it does not require a TTG, and the additional symbol changes the single Type-1 subframe into the Type-2 subframe.

Likewise, a second FDD frame 1320 includes one additional symbol compared with the TDD frame 840 illustrated in FIG. 8 because it does not require a TTG, and the additional symbol changes the single Type-3 subframe into the Type-1 subframe. Thus, the FDD frame 1320 includes a total of four Type-1 subframes and two Type-3 subframes. The position of the Type-3 subframe is not limited thereto and may be freely modified.

Also, like a third FDD frame 1330, one symbol 1331 may be separated, and the other remaining symbols may be used to configure three Type-1 subframes and three Type-3 subframes. In this case, the position of the separated symbol 1331 is not limited thereto.

Also, like a fourth FDD frame 1340, two symbols 1341 and 1343 may be separated, and like another FDD frame 1350, three symbols 1351, 1353, and 1355 may be separated. The symbols 1331, 1341, 1343, 1351, 1353, and 1355 independently configured in the FDD frames 1330, 1340, and 1350 may be used for transmitting control information in units of symbols, for example, additional information such as a preamble or an FCH.

Hereinafter, a TDD frame structure when a channel bandwidth is 7 MHz and a CP length is ¹⁄₁₆ Tb will be described.

Figure 14:
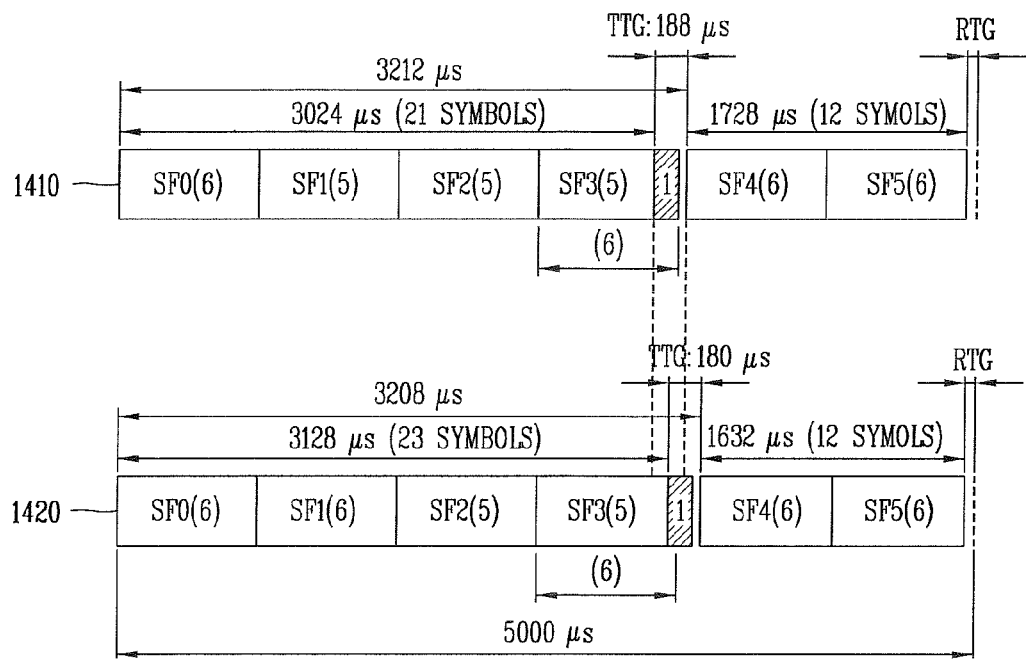
FIG. 14 is a view showing a TDD frame structure according to another exemplary embodiment of the present invention.

FIG. 14 is a view showing a TDD frame structure according to another exemplary embodiment of the present invention. The TDD frame structure has a CP length of ¹⁄₁₆ Tb compared with the case where the CP length is ⅛ Tb as described above.

With reference to Table 1, when a frame transport channel bandwidth is 7 MHz, thirty-four OFDM symbols are available for the CP length ⅛ Tb, and thirty-six OFDM symbols are available for the CP length of ¹⁄₁₆ Tb.

In the basic frame structure in the 5 MHz, 10 MHz, and 20 MHz channel transport bands as described above, the Type-1 subframe size including six symbol units is used as the basic subframe, and the present exemplary embodiment also proposes the structure in which the Type-1 subframe including six symbol units is used as the basic subframe and used as many as possible in consideration of a legacy support.

First, in the case of a TDD frame 1410 having a CP length of ⅛ Tb, when the ratio of DL and UL is 4:2, in consideration of the fact that the first subframe is used for the SFH in the TDD mode, the first subframe is configured as the Type-1 basic subframe SF0 including six symbols, the second and third subframes SF1 and SF2 are configured as the Type-3 subframes including five symbols, and the fourth DL subframe SF3 uses the structure of the Type-1 subframe but the last one symbol is allocated as a TTG symbol between the DL and the UL, resulting in that the fourth subframe is changed into the Type-3 subframe including five symbols. The UL subframes SF4 and SF5 are configured as the Type-1 subframes including six symbol units. Through the foregoing structure, a frame can be basically configured to have the basic subframes including six symbol units as many as possible, and accordingly, a frame having commonness with the frame structure of a different channel transport band can be configured in the 7 MHz channel transport band, through which data can be transmitted and received.

In the case of a TDD frame 1420 having a CP length of ¹⁄₁₆ Tb, likewise as above described, the basic subframe is configured as the Type-1 subframe having six symbol units, and a frame is configured is configured such that the number of the basic subframes is maximized. Thus, as illustrated, the Type-1 subframe including six symbol units, excluding the last subframe SF3, is configured,. In the last subframe SF3 of DL, one symbol is allocated for the TTG, so the last subframe SF3 is configured as the Type-3 subframe having five symbols.

Also, as described above, in order to prevent interference in consideration of an environment in which the TDD frame 1410 structure having the CP length of ⅛ Tb and the frame 1420 structure having the CP length of ¹⁄₁₆ Tb coexist, the TDD frame structure must be designed such that the boundaries of the DL and the UL between the TDD frames 1410 and 1420 having different CP lengths do not overlap with each other.

In the case of the TDD frame 1420 having the CP length of ¹⁄₁₆ Tb, in order to prevent a generation of an interference at the boundary of the DL and UL of the TDD frame having the CP length of ⅛ Tb, 6*k−1 number of OFDM symbols are allocated to the DL and 6*j number of OFDM symbols are allocated to the UL. In the illustrated example, k is 4 and j is 2. Also, with reference to the comparison between the two frames illustrated in FIG. 14, it is noted that the boundaries of the DL and UL do not overlap with each other.

In comparison between the two frames 1410 and 1420 based on the number of allocated symbols, the number of symbols within the TDD frame 1410 of ⅛ Tb is 34 (21 symbols for DL, one symbol for TTG and 12 symbols for UL), while the number of symbols within the frame 1420 of ¹⁄₁₆ Tb is 36 (6*k−1=23 symbols for DL, one symbol for TTG, and 6*j=12 symbols for UL). Thus, when the TDD frame in the ¹⁄₁₆ Tb is designed based on the TDD frame 710 of ⅛ Tb, the remaining two OFDM symbols, compared with the number of symbols of the TDD frame 1410 of ⅛ Tb, is allocated to the two subframes (SF1 and SF2) including five symbols. Then, one data frame 1420 includes six Type-1 subframes including six symbols. Also, as described above, the last symbol of the DL is allocated for the TTG.

Figure 15:
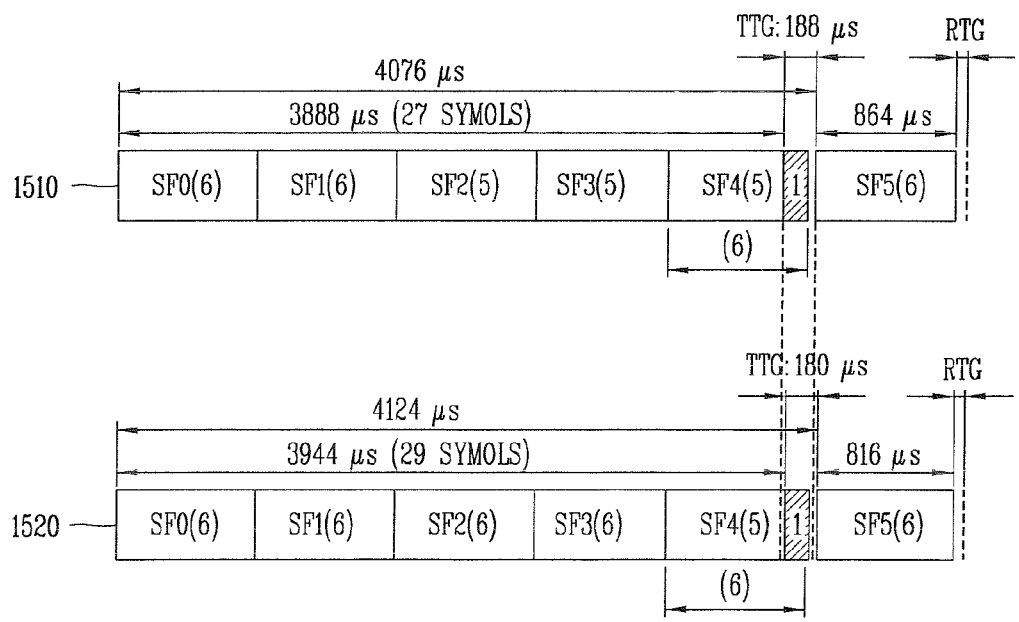
FIG. 15 is a view showing a TDD frame structure according to another exemplary embodiment of the present invention.

FIG. 15 is a view showing a TDD frame structure according to another exemplary embodiment of the present invention.

As for a TDD frame 1510 having a CP length of ⅛ Tb, because the overall symbol number is 34, when four Type-1 subframes including six symbol units are configured and two Type-3 subframes including five symbol units are configured, it can be configured such that the basic subframes including six symbol units are maximized, and accordingly, a frame can be designed such that it has a commonness with a frame structure in a different channel transport band, even in the 7 MHz channel transport band. In the TDD mode, it is preferred that the first subframe is configured as the Type-1 subframe SF0 including six symbols in consideration of the fact that the first subframe is used for the SFH (Super Frame Header). Also, because the last one symbol of the DL is allocated as the TTG symbol between the DL and the UL, when the last subframe of the DL is configured as the Type-1 subframe including six symbol units and the last one symbol is allocated for the TTG, the Type-1 subframe is changed into the Type-3 subframe SF4 including five symbol units.

In the case of a TDD frame 1520 having a CP length of 1/16 Tb, likewise as above described with reference to FIG. 14, the basic subframe is configured as the Type-1 subframe having six symbol units, and a frame is configured is configured such that the number of the basic subframes is maximized. Thus, as illustrated, the basic subframe including six symbol units, excluding the last subframe SF4, is configured. In the last subframe SF4 of DL, one symbol is allocated for the TTG, so the last subframe SF4 is configured as the Type-3 subframe having five symbols.

Also, as described above, in order to prevent interference in consideration of an environment in which the TDD frame 1510 structure having the CP length of ⅛ Tb and the frame 1520 structure having the CP length of 1/16 Tb coexist, the TDD frame structure must be designed such that the boundaries of the DL and the UL between the TDD frames 1510 and 1520 having different CP lengths do not overlap with each other.

As illustrated, In the case of the TDD frame 1520 having the CP length of 1/16 Tb, in order to prevent a generation of an interference at the boundary of the DL and UL of the TDD frame having the CP length of ⅛ Tb, 6*k−1 number of OFDM symbols are allocated to the DL and 6*j number of OFDM symbols are allocated to the UL. In the illustrated example, k is 5 and j is 1.

Figure 16:
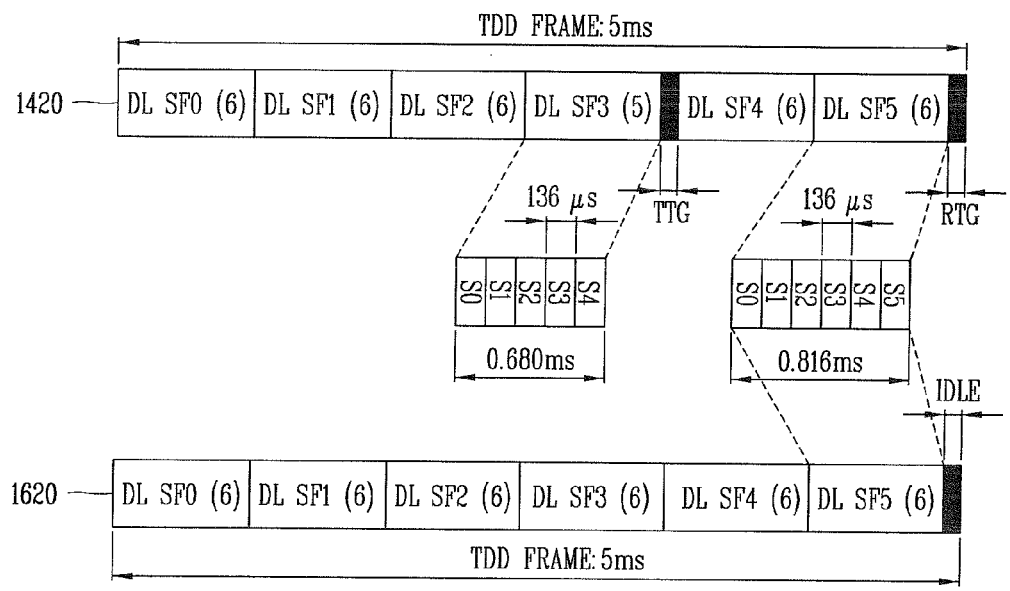
FIG. 16 is a view showing an FDD frame structure according to another exemplary embodiment of the present invention.

FIG. 16 is a view showing an FDD frame structure according to another exemplary embodiment of the present invention.

In the present exemplary embodiment, the FDD frame is designed such that it has commonness with the TDD structure.

Namely, in the FDD, a TTG is not required, so 36 symbols can be all used to configure and dispose six Type-1 subframes each including six symbols. Thus, because the basic subframes by six units are used to be maximized, the PHY structure and MAC structure defined in the existing 5 MHz, 10 MHz, and 20 MHz can be re-used and a system complexity can be reduced.

Figure 17:
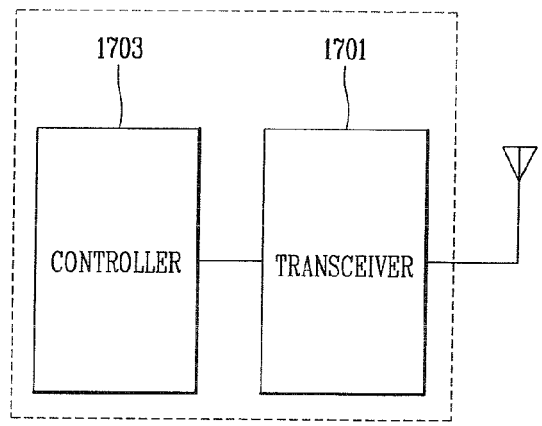
FIG. 17 is a schematic block diagram of an apparatus for transmitting and receiving data according to an exemplary embodiment of the present invention.

FIG. 17 is a schematic block diagram of an apparatus for transmitting and receiving data according to an exemplary embodiment of the present invention.

The apparatus for transmitting and receiving data according to an exemplary embodiment of the present invention includes a transceiver 1701 for transmitting and receiving data configured in the form of a frame and a controller 1703 for controlling transmission and reception of data of the transceiver 1701.

The controller 1703 sets a data frame for transmitting and receiving data via downlink and uplink, and controls the transceiver 1701 to transmit and receive data through the set data frame. The controller 1703 configures the frame described above with reference to FIGS. 3 to 16 according to the FDD or TDD mode to transmit and receive data. Preferably, the data frame set by the controller 1703 includes one or more Type-1 subframes each including six data symbols, one or more Type-2 subframes each including seven data symbols, one or more Type-3 subframes each including five data symbols, and one or more Type-4 subframes each including nine data symbols. A substantial frame is formed with reference to the bandwidth of the transport channels and the system parameters of Table 1. The frame setting by the controller 1703 has been described above, so its description herein will be omitted.

According to another exemplary embodiment of the present invention, the controller 1703 sets a data frame including one or more subframes each including n number of data symbols, and controls the transceiver 1701 to transmit and receive data through the set data frame.

Also, in configuring the data frame, the controller 1703 configures the data frame such that the number of subframes including n number of symbol units is maximized.

Preferably, the data frame is configured such that basic subframes including six data symbols are maximized, and a substantial frame is formed with reference to the bandwidth of the transport channels and the system parameters of Table 1.

The methods according to the present invention described thus far can be implemented as software, hardware or their combination. For example, the method according to the present invention may be stored in a storage medium (e.g., an internal memory of a terminal, a flash memory, a hard disk, and the like), and may be implemented as codes or commands in a software program that can be executed by a processor (e.g., a microprocessor within a terminal).

The invention being thus described, it will be obvious that the same may be varied in many ways. Such variations are not to be regarded as a departure from the scope of the invention, and all such modifications as would be obvious to one skilled in the art are intended to be included within the scope of the following claims.

The invention claimed is:

1. A method for transceiving signals using a predetermined frame structure in a broadband wireless communication system, the method comprising:
    configuring, by a controller, a Time Division Duplex (TDD) frame according to the predetermined frame structure, the TDD frame having a channel bandwidth of 7 MHz, and controlling transmission and receipt of data through the TDD frame; and
    transceiving a signal through the TDD frame according to the predetermined frame structure,
    wherein a Cyclic Prefix length of the TDD frame corresponds to 1/16 of an effective symbol length,
    wherein the TDD frame includes a downlink interval and an uplink interval that is located subsequent to the downlink interval,
    wherein a Transmit Transition Gap (TTG) interval is located between the downlink interval and the uplink interval,
    wherein a Receive Transition Gap (RTG) interval is located next to a last uplink subframe of the uplink interval, wherein a total length of the TTG interval and the RTG interval is 240 μs, wherein the downlink interval includes four downlink subframes comprising three type-1 downlink subframes that include six Orthogonal Frequency Division Multiple Access (OFDMA) symbols and a type-3 downlink subframe that includes five OFDMA symbols, wherein a first downlink subframe of the three type-1 downlink subframes is configured to include a superframe header, wherein the type-3 subframe is located subsequent to the three type-1 downlink subframes, wherein the uplink interval includes two uplink subframes comprising only a type-1 uplink subframe that includes six OFDMA symbols, wherein the type-1 uplink subframe has a length of 0.816 ms and the type-3 downlink subframe has a length of 0.680 ms, wherein the type-1 uplink subframe has a same size as a subframe included in a Frequency Division Duplex (FDD) frame having a channel bandwidth of 7 MHz, the FDD frame configured to have a Cyclic Prefix length corresponding to $1/16$ of an effective symbol length.

* * * * *